Figure 1:
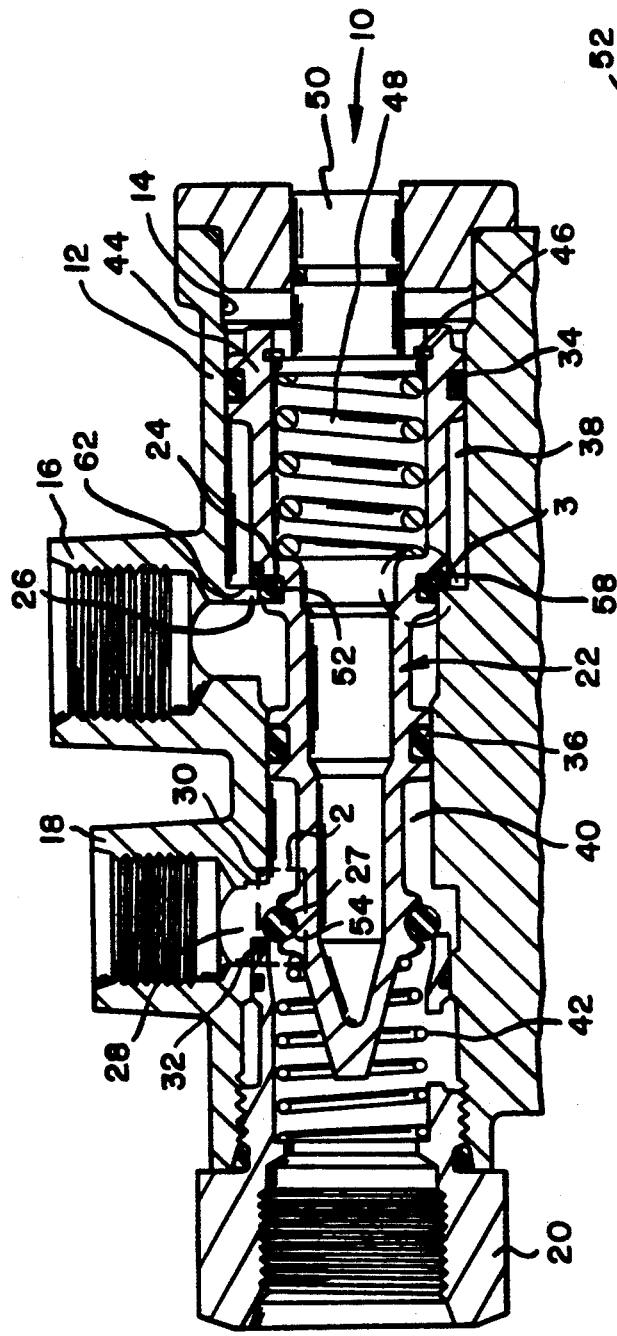

United States Patent [19]

Johnson et al.

[11] Patent Number: 5,080,133

[45] Date of Patent: Jan. 14, 1992

[54] CONTROL VALVE ASSEMBLY

[75] Inventors: Duane R. Johnson, Wellington; Robert J. Herbst, Avon, both of Ohio

[73] Assignee: Allied-Signal Inc., Morristown, N.J.

[21] Appl. No.: 683,147

[22] Filed: Apr. 10, 1991

[51] Int. Cl.[5] ............................................. F16K 11/04
[52] U.S. Cl. ............................. 137/625.12; 137/625.5; 251/284; 251/900
[58] Field of Search ....................... 137/625.12, 625.5; 251/284, 900

[56] References Cited

U.S. PATENT DOCUMENTS

| | | |
|---|---|---|
| 1,313,554 | 8/1919 | Nielsen . |
| 1,366,151 | 8/1921 | Astrom . |
| 2,217,834 | 10/1940 | Corbin, Jr. . |
| 2,417,494 | 3/1947 | Hoof . |
| 2,480,529 | 8/1949 | Waag . |
| 2,515,029 | 7/1950 | Almond ............................ 251/900 X |
| 2,599,622 | 6/1952 | Folmsbee . |
| 2,624,542 | 1/1953 | Ghormley . |
| 2,650,793 | 8/1953 | Clark, Jr. et al. . |
| 2,703,105 | 3/1955 | Stoner ............................ 137/625.12 |
| 2,791,238 | 5/1957 | Bryant . |
| 3,099,432 | 7/1963 | Zeitlin . |
| 3,202,178 | 8/1965 | Wolfe . |
| 3,223,122 | 12/1965 | Banker . |
| 3,996,965 | 12/1976 | Peters . |
| 4,128,110 | 12/1978 | Haytayan . |
| 4,244,553 | 1/1981 | Escobosa . |
| 4,313,463 | 2/1982 | Weirich . |
| 4,408,632 | 10/1983 | Kent . |
| 4,570,669 | 2/1986 | Pauliukonis . |
| 4,647,012 | 3/1987 | Gartner . |
| 4,738,282 | 4/1988 | Boehringer . |
| 4,765,590 | 8/1988 | Hayman . |
| 4,818,397 | 4/1989 | Joy . |

Primary Examiner—Robert G. Nilson
Attorney, Agent, or Firm—Ken C. Decker; William N. Antonis

[57] ABSTRACT

A valve assembly includes a housing and a valve plunger slidably mounted within the housing, which carries a pair of valve engaging, ringlike elements for engagement with corresponding seats on the plunger. The cross-sectional diameter of one of the ringlike valve elements is substantially greater than the other, and fits on the plunger with clearance to permit it to be deformed and deflected relative to the plunger to assure a proper sealing engagement of the other ringlike element. A collar retains the other ringlike element, and acts against the valve seat to limit movement of the plunger relative to the housing.

18 Claims, 1 Drawing Sheet

CONTROL VALVE ASSEMBLY

This invention relates to a fluid control valve.

Many fluid control valves employ dynamic seals and seats which control the flow of fluid. When the valve seat is open, the fluid exerts little or no force on the seal which can cause it to fail, but when the seal comes in contact with the seat the fluid flow is stopped. Here, the forces being exerted on the seal by the fluid are either balanced and tend to help restrain the seal or cause the seal to fail. Furthermore, in order to minimize parts, it is common to provide a single control plunger to control fluid communication to a separate system, on separate parts of a same system, when such control must be effected simultaneously. Such a valve and system is disclosed in U.S. Pat. No. 4,923,254. One problem in effecting such simultaneous actuation is that tolerance between the actuating members must be tightly controlled to effect simultaneous sealing between the valve seat engaging members and their corresponding valve seats The present invention uses unretained o-ring seals of simple o-ring design. One seal is maintained in position on the plunger by inherent resiliency and is designed so that it engages its corresponding seat and then is deformed and/or deflected as the other valve engaging member engages its seat, thereby taking up any clearances and assuring proper operation of the valve. The other valve member is held in place by a collar which engages a portion of the valve seat to limit travel of the plunger. Neither of the valve engaging members are bonded to the plunger and both are of a simple, common and inexpensive o-ring shape, thereby minimizing cost. Although the particular valve disclosed herein controls a hydraulic fluid system the invention can be used with all types of fluids, both compressible and incompressible.

Figure 3:
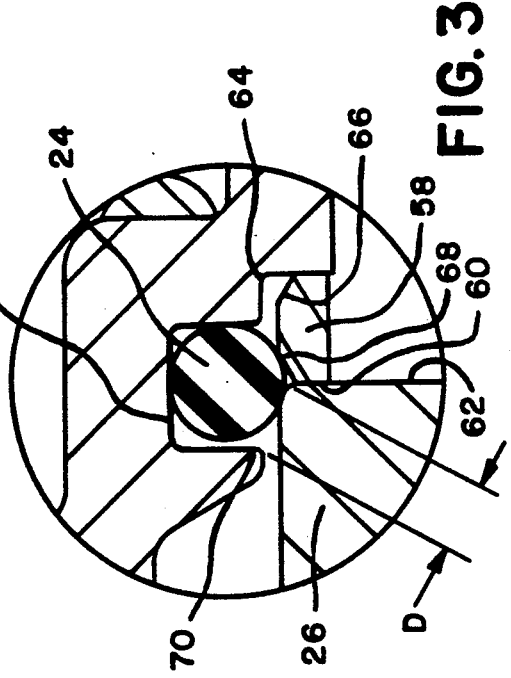
Figure 2:
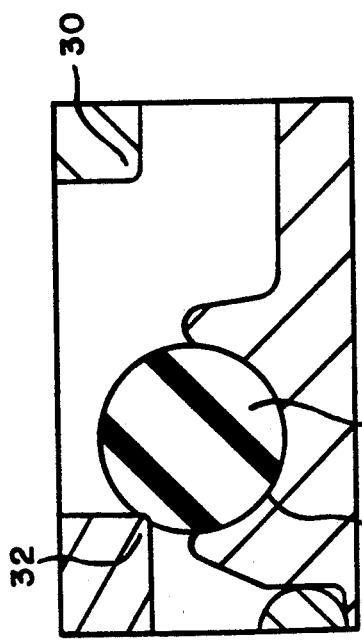

These and other advantages of the present invention will become apparent from the following description, with reference to the accompanying drawings, in which FIG. 1 is a cross-sectional view of a fluid control valve made pursuant to the teachings of the present invention;

FIG. 2 is an enlarged view of the indicated circumscribed portion of FIG. 1; and FIG. 3 is an enlarged view of the other indicated portion of FIG. 1.

Referring now to the drawings, a valve assembly generally indicated by the numeral 10 includes a housing 12 defining a bore 14 therewithin. Housing 12 includes ports 16, 18 and 20 for communicating fluid to and from the bore 14. A valve plunger 22 is slidably received within the bore 14 and is provided with a valve engaging member or ring 24 which is engageable with a valve seat 26 carried on the wall of the bore 14. Axially spaced along the plunger 22 from the valve engaging member 24 is another valve engaging member or ring 27, a portion of which projects into the gap 28 defined between valve seat 30 and valve seat 32. The gap 28 communicates with the port 18. The valve engaging member 27 is engageable with either the valve seat 30 or the valve seat 32 as the valve plunger 22 is moved within axial bore 14. Valve plunger 22 further carries axially spaced seals 34, 36, which sealingly engage the wall of the bore 14.

Engagement of the valve engaging member 24 with the valve seat 26 controls communication between the port 16 and an annular recess 38 defined between the plunger 22 and the wall of the bore 14. A passage (not shown) communicates the recess 38 with other components of the system in which the valve 10 is used, so that the plunger 22 can be used to control communication between the port 16 and such other components. The valve engaging member 27 cooperates with the lower valve seat 32 to control communication between the port 18 and the port 20, and cooperates with the upper valve seat 30 to control communication between the port 18 and a recess 40 defined between the plunger 22 and the wall of the bore 14. The recess 40 is also communicated to other components by a passage (not shown), so that operation of the plunger 22 closes communication from the port 18 to the port 20 to provide communication between the port 18 and the recess 40 as plunger 22 is moved to the position of FIG. 1. A spring 42 biases the plunger 22 to the right, viewing the Figure. The end 44 of the plunger 22 carries a spring 48, which urges a member 50 against shoulder 46 on the plunger 22 to provide for operation of the plunger 22 through the spring 48 by the member 50 which extends through the upper end of the housing 12. The member 50 is in turn engaged by a suitable manual actuator.

Each of the valve engaging members 24, 27 is a ring of elastomeric material, such as rubber, which circumscribes the plunger 22 and is received within a corresponding groove 52, 54 circumscribing the plunger. The valve engaging members 24, 27 have an inner diameter before they are installed on the plunger which is less than the diameter of the corresponding groove 52 or 54 so that the rings are stretched when they are installed on the plunger and are retained on the plunger by the resiliency of the ring. Preferably, each of the rings comprising the valve engaging members 24, 27 have a substantially circular cross-section, and thus are relatively inexpensive o-ring seals. The valve engaging member 24 is also retained on the plunger 22 by a collar member 58, which circumscribes the plunger 22 and engages the valve seat engaging member 24, while still leaving sufficient surface area of the member 24 available to contact and sealingly engage the valve seat 26, as will be described in detail hereinafter. The collar 58 further includes a stop surface 60 which engages a stop surface 62 defined on the wall of bore 14 adjacent valve seat 26 to act as a stop for the plunger 22 when the valve seat engaging member 24 is fully engaged with the valve seat 26.

The cross-sectional area of the ring or valve engaging member 27 is substantially greater than the cross-sectional area of the ring or valve engaging member 24, and the distance between the members 24, 27 along the axial length of the plunger 22 is such that the member 27 is compressed against its valve seat 32 just before the member 24 begins to engage its valve seat 26. It will be noted from FIG. 2 that the groove 54 extends approximately one-half way around the ring or valve seat engaging member 27 to fully grasp the ring while permitting sufficient surface area of the ring or member 27 to be exposed to engage either of the valve seats 30, 32. A closure is provided between the ring or member 27 and the corresponding wall of the groove 54. Accordingly, deflection of the valve seat engaging member 27 along the axis of the plunger 22 is permitted as the member or ring 27 engages with either of the valve seats 30 or 32. Accordingly, as the member or ring 27 begins to engage the valve seat 32, the member or ring 27 is both compressed and deflected, to thereby take any clearance as might be necessary to permit the valve engaging member or ring 24 to fully engage its corresponding seat 26, while still providing a sealing engagement with the seat 32 when the plunger is moved fully to the position in which the member or ring 27 is sealingly engaged with the seat 32. As discussed above, axial movement of the plunger 22 is limited by engagement of the surface 60 with the surface 62.

Referring now to FIG. 3, groove 52 is stepped to define an offset portion 64 which receives the collar 58. The collar 58 is provided with chamfers 66, 68 on the inner diameter thereof. Accordingly, the collar 58 is symmetrical, so that it may be installed in either orientation when the assembly is manufactured. However, the chamfer 66 facilitates movement of the collar 58 over the ring or valve engaging element 24, as the inner diameter of the collar 58 is slightly less than the outer installed diameter of the ring or valve engaging member 24. Accordingly, the ring or valve engaging member 24 exerts a bias against the chamfer 68, thereby retaining the collar 58 in place on the assembly. On the other hand, the collar 58 restrains the ring or member 24 to prevent it from being forced out of the groove 52 by the force of fluid pressure acting around the ring or member 24 when the latter is engaged with the valve seat 26. The restricted opening D defined between the lower surface 60 and the collar 58 and the edge 70 of the groove 52 is sized such that it is smaller than the cross-sectional installed diameter of the ring or valve engaging member 24, so that fluid pressure from the port 16 which enters the groove 52 between the edge 70 and the valve seat 26 cannot force the ring or valve engaging member 24 out of the groove 52.

We claim:

1. Valve assembly comprising a housing defining a longitudinal bore therewithin, a valve plunger slidably mounted in said longitudinal bore, a pair of valve engaging elements carried by said valve plunger for engagement with a corresponding pair of valve seats defined on the wall of said bore to control communication between portions of said longitudinal bore, each of said valve engaging elements being a ring of elastomeric material circumscribing said plunger and being received in a corresponding groove circumscribing said plunger, said rings having an inner and outer diameter, the inner diameter of one of said rings before it is installed on the plunger being less than the diameter of its corresponding groove so that the one ring is stretched when it is installed on the plunger and is retained thereon by the resiliency of the one ring, said one ring having a cross sectional area greater than the cross sectional area of the other ring, the distance between said rings along said plunger permitting said one ring to engage its corresponding valve seat before the other ring engages its valve seat, said one ring deforming and/or deflecting relative to said plunger to permit the other ring to engage its seat so that both of said valve engaging elements sealingly engage their corresponding valve seats as said plunger is shifted past a predetermined position in said bore.

2. Valve assembly as claimed in claim 1, wherein the groove receiving said one ring cooperates with the latter to define a clearance therebetween to permit deflection of said one ring into said clearance relative to said plunger as the one ring engages its corresponding valve seat.

3. Valve assembly as claimed in claim 2, wherein the wall of said bore includes a third valve seat cooperating with said corresponding valve seat to define a gap therebetween, said one ring projecting into said gap for engagement with either said third valve seat or the corresponding valve seat as the plunger is moved within the bore.

4. Valve assembly as claimed in claim 3, wherein said one ring has a substantially circular cross-section.

5. Valve assembly as claimed in claim 1, wherein the groove receiving said one ring cooperates with the latter to define a clearance therebetween to permit deflection of said one ring into said clearance relative to said plunger as the one ring engages its corresponding valve seat.

6. Valve assembly as claimed in claim 5, wherein said one ring has a substantially circular cross-section.

7. Valve assembly as claimed in claim 2, wherein said one groove extends substantially around one half of the cross-section circumference of said one ring.

8. Valve assembly as claimed in claim 1, wherein said plunger carries a circumferentially extending collar engaging the other ring to retain it in its corresponding groove in opposition to fluid forces tending to force the other ring out of its groove.

9. Valve assembly as claimed in claim 8, wherein said collar projects across a portion of the groove receiving said other ring and cooperates with the plunger to define a gap exposing a portion of said other ring to enable said portion to engage the corresponding valve seat, said gap having a width less than the diameter of the cross-section of said ring.

10. Valve assembly as claimed in claim 8, wherein said collar defined an abutment surface engaging a corresponding stop surface defined on said bore to prevent movement of the plunger past a predetermined position relative to said bore because of the engagement of the abutment surface with the stop surface.

11. Valve assembly as claimed in claim 8, wherein said collar has an inner circumferential surface and a chamfer on said inner circumferential surface to permit the collar to be forced past the other ring without damaging the ring when the collar is installed on the plunger.

12. Valve assembly as claimed in claim 8, wherein said collar has an inner circumferential surface and leading and trailing chamfers extending circumferentially about the inner circumferential surface of said collar, said leading chamfer permitting the collar to be forced past the other ring without damaging the other ring when the collar is installed on the plunger, said trailing chamfer engaging said other ring to retain the latter in its groove.

13. Valve assembly comprising a housing defining a longitudinal bore therewithin, a valve plunger slidably mounted in said longitudinal bore, a valve engaging element carried by said valve plunger for engagement with a corresponding valve seat defined on the wall of said bore to control communication between portions of said longitudinal bore, said valve engaging element being a ring of elastomeric material circumscribing said plunger and being received in a corresponding groove circumscribing said plunger, and a circumferentially extending collar having inner and outer circumferential surfaces, said ring having an outer diameter that is greater than the diameter of said inner circumferential surface of the collar, said outer diameter of the ring engaging the inner circumferential surface of the collar so that the elasticity of the ring yieldably retains the collar on the plunger and the collar engages the ring to retain it in its groove in opposition to fluid forces tending to force said ring out of its groove, said collar being secured to the plunger solely by the elasticity of the ring and being otherwise unattached to said plunger.

14. Valve assembly as claimed in claim 13, wherein said collar defines an abutment surface engaging a corresponding stop surface defined on said bore to prevent movement of the plunger past a predetermined position relative to said bore because of the engagement of the abutment surface with the stop surface.

15. Valve assembly as claimed in claim 13, wherein said collar has a chamfer on said inner circumferential surface to permit the collar to be forced past the ring without damaging the ring when the collar is installed on the plunger.

16. Valve assembly as claimed in claim 13, wherein said collar has leading and trailing chamfers extending circumferentially about the inner circumferential surface of said collar, said leading chamfer permitting the collar to be forced past the ring without damaging the ring when the collar is installed on the plunger, said trailing chamfer engaging said ring to retain the latter in its groove.

17. Valve assembly as claimed in claim 13, wherein said collar has a chamfer extending circumferentially about the inner circumferential surface of said collar, said chamfer engaging said ring to retain the latter in its groove.

18. Valve assembly as claimed in claim 13, wherein said collar projects across a portion of said groove and cooperating with the plunger to define a gap exposing a portion of said ring to enable said portion to engage the valve seat, said gap having a width less than a diameter of a cross-section of said ring.

* * * * *